(12) United States Patent
Sarata et al.

(10) Patent No.: US 8,129,063 B2
(45) Date of Patent: Mar. 6, 2012

(54) HYDROGEN PRODUCTION APPARATUS WITH SOLUTION FEED CONTROL TO ELIMINATE BUILD-UP OF PRODUCTS ON A SOLID REACTANT

(75) Inventors: Takafumi Sarata, Chiba (JP);
Fumiharu Iwasaki, Chiba (JP);
Norimasa Yanase, Chiba (JP);
Kazutaka Yuzurihara, Chiba (JP);
Noboru Ishisone, Chiba (JP); Toru Ozaki, Chiba (JP); Tsuneaki Tamachi, Chiba (JP)

(73) Assignee: Seiko Instruments Inc. (JP)

( * ) Notice: Subject to any disclaimer, the term of this patent is extended or adjusted under 35 U.S.C. 154(b) by 353 days.

(21) Appl. No.: 12/313,000

(22) PCT Filed: Dec. 21, 2007

(86) PCT No.: PCT/JP2007/074720
§ 371 (c)(1),
(2), (4) Date: Jun. 3, 2009

(87) PCT Pub. No.: WO2008/099568
PCT Pub. Date: Aug. 21, 2008

(65) Prior Publication Data
US 2009/0305095 A1    Dec. 10, 2009

(30) Foreign Application Priority Data

Feb. 16, 2007  (JP) ................................. 2007-037162

(51) Int. Cl.
*H01M 8/04* (2006.01)

(52) U.S. Cl. ...................................................... 429/443
(58) Field of Classification Search .................. 429/416, 429/443, 421, 447, 515, 498, 428; 423/650; 208/136, 447
See application file for complete search history.

(56) References Cited

U.S. PATENT DOCUMENTS

| | | | | |
|---|---|---|---|---|
| 2,913,399 A | * | 11/1959 | Deering et al. | 208/136 |
| 5,976,725 A | * | 11/1999 | Gamo et al. | 429/421 |
| 6,080,306 A | * | 6/2000 | Falkner | 210/123 |
| 2001/0045364 A1 | | 11/2001 | Hockaday et al. | 205/338 |
| 2006/0147776 A1 | * | 7/2006 | Sarata et al. | 429/30 |
| 2008/0220297 A1 | * | 9/2008 | Sarata et al. | 429/19 |
| 2010/0151338 A1 | * | 6/2010 | Sarata et al. | 429/416 |
| 2010/0227241 A1 | * | 9/2010 | Sarata et al. | 429/443 |

FOREIGN PATENT DOCUMENTS

| | | |
|---|---|---|
| JP | 2002137903 | 5/2002 |
| JP | 2004087470 | 3/2004 |
| JP | 2007186370 | 7/2007 |

* cited by examiner

*Primary Examiner* — Chandrika Prasad
(74) *Attorney, Agent, or Firm* — Adams & Wilks (57) ABSTRACT

A hydrogen production apparatus 1 is constructed in which when work 3 is close to a supply hole 7, a strut 22 is pushed to open the supply hole 7, and when erosion of the work 3 progresses to cause the strut 22 to protrude, the supply hole 7 is closed with a seal member 24, so that products do not stay on the work 3, a reaction solution 12 is not fed to portions other than the work 3, and even if the attitude of the apparatus is changed, a hydrogen production reaction can be controlled appropriately.

12 Claims, 10 Drawing Sheets

HYDROGEN PRODUCTION APPARATUS WITH SOLUTION FEED CONTROL TO ELIMINATE BUILD-UP OF PRODUCTS ON A SOLID REACTANT

CROSS-REFERENCE TO RELATED APPLICATION

This application is a U.S. national stage application of International Application No. PCT/JP2007/074720, filed Dec. 21, 2007, claiming a priority date of Feb. 16, 2007, and published in a non-English language.

TECHNICAL FIELD

This invention relates to a hydrogen production apparatus for producing hydrogen, for example, by decomposing a metal hydride, and a fuel cell system using hydrogen produced by the hydrogen production apparatus as a fuel.

BACKGROUND ART

With increasing consciousness of energy problems in recent years, there has been a demand for a power source or power supply having a higher energy density and involving clean emissions. Fuel cells are power generators having an energy density several times that of existing batteries, and are characterized in that they have a high energy efficiency, and give off no or few nitrogen oxides or sulfur oxides as contained in emission gases. Thus, the fuel cell is a very effective device which fulfills requirements for a next-generation power supply device.

The fuel cell, which obtains an electromotive force by an electrochemical reaction between hydrogen and oxygen, needs hydrogen as a fuel. A known example of equipment for producing a hydrogen gas is a hydrogen production apparatus of a structure having a reaction container accommodating a metal hydride (boron hydride salt), and a water tank, and adapted to jet water within the water tank at the metal hydride inside the reaction container by a pump (see, for example, Patent Document 1).

With the conventional hydrogen production apparatus, when hydrogen is produced by supplying water to the metal hydride, it is expected that the products build up or stay on the metal hydride to coat the metal hydride, lowering the rate of reaction. Thus, it has been practiced to dispose the metal hydride in an upper part of the container, and spray the bottom surface of the metal hydride with water, thereby dropping water, which has not been used in the reaction, and the products onto a bottom part of the container. Water which has not been used in the reaction is recovered into the water tank by the pump, but once accumulates at the bottom part of the container.

As noted above, the hydrogen production apparatus has been restricted in its attitude or orientation during usage such that the metal hydride is disposed in the upper part of the container, and water and the products are dropped onto the bottom part of the container. If the conventional hydrogen production apparatus is used in a changed attitude or orientation, the metal hydride is coated with the products. Since water remaining unused in the reaction does not drop onto the bottom part of the container, moreover, the problem occurs that the water cannot be recovered into the water tank. Furthermore, the water unused in the reaction contacts the metal hydride again, and the recontacting water causes a hydrogen reaction.

If water once accumulating at the bottom part of the container contacts the metal hydride because of the change in the attitude or orientation, in particular, unexpected hydrogen production occurs, posing the serious problem that it becomes impossible to control the reaction. As a result, it has been unrealistic to use the hydrogen production apparatus as a power supply device for portable instruments, such as a cellular phone and a digital camera, which require a structure adapting to an attitude change.

Patent Document 1: JP-A-2002-137903

SUMMARY OF THE INVENTION

Problems to be Solved by the Invention

The present invention has been accomplished in the light of the above-described situations. It is an object of the invention to provide a hydrogen production apparatus which eliminates the build-up of products on a solid reactant, and precludes the dispatch of a reaction solution to other places than the solid reactant, thereby making it possible to control a hydrogen production reaction appropriately even if the attitude or orientation of the apparatus is changed.

Besides, the present invention has been accomplished in the light of the above-described situations. It is another object of the invention to provide a fuel cell system equipped with a hydrogen production apparatus which eliminates the build-up of products on a solid reactant, and precludes the dispatch of a reaction solution to other places than the solid reactant, thereby making it possible to control a hydrogen production reaction appropriately even if the attitude (orientation) of the apparatus is changed.

Means for Solving the Problems

The hydrogen production apparatus of the present invention, intended for attaining the above objects, comprises: a reaction solution container accommodating a reaction solution; a reactant container which has a supply hole fed with the reaction solution from the reaction solution container, accommodates a solid reactant for accelerating production of hydrogen upon reaction with the reaction solution, and has a discharge port for discharging hydrogen produced; pressing means for pressing the solid reactant, which is disposed in correspondence with a plurality of the supply holes, toward the supply holes; and solution feed control means, provided in each of the plurality of the supply holes, for opening the supply hole to permit flow-through of the reaction solution when an end surface of the solid reactant pressed by the pressing means is located within a predetermined distance from the supply hole, and for closing the supply hole to inhibit flow-through of the reaction solution when the end surface of the solid reactant is not located within the predetermined distance from the supply hole.

According to this feature, the reaction solution is fed to the solid reactant in contact with the supply hole (the solid reactant having the end surface located within the predetermined distance) to produce hydrogen, which is discharged through the discharge port. Since hydrogen passes through the gap between the solid reactant and the wall surface of the reaction container on the side of the supply hole, the products do not stay on the solid reactant. Moreover, the solid reactant is pressed toward the supply hole by the pressing means, so that even if the attitude or orientation of the apparatus is changed, the reaction solution can be supplied to the solid reactant.

Furthermore, the hydrogen production reaction can be controlled. That is, the amount of reaction with the solid reactant becomes large around the supply hole. Thus, as the production of hydrogen proceeds, a cavity occurs in the solid reactant around the supply hole (the end surface of the solid reactant is not located within the predetermined distance). If the cavity reaches a side part of the solid reactant, the reaction solution does not contact the solid reactant, but flows out. The outflowing reaction solution stays on the bottom surface of the reaction container. If the attitude of the apparatus changes, the solid reactant and the staying reaction solution contact to cause a hydrogen production reaction. In the present invention, when the solid reactant leaves the supply hole, the supply hole is closed, and the reaction solution is not fed. Thus, the hydrogen production reaction is controlled, without the stay of the reaction solution.

If there are a plurality of the supply holes, the amount of the reaction solution fed tends to be larger around the lower supply hole than around the upper supply hole, and the amount of reaction with the solid reactant around the lower supply hole tends to increase, owing to the influence of gravity. As a result, mainly a lower part of the solid reactant decreases, resulting in the closure of the supply hole, thereby failing to feed the reaction solution. Thus, the reaction occurs only in an upper part of the solid reactant, and the upper part of the solid reactant is consumed, leading to an decrease in the volume of the solid reactant. As a result, the lower supply hole approaches the solid reactant, and is opened, whereupon the reaction solution is fed to initiate the reaction. Afterwards, this procedure is repeated, and all of the surfaces of the solid reactant opposing the supply holes are uniformly consumed. Hence, the reaction solution is supplied only to the solid reactant, and does not flow out to sites other than the solid reactant.

Even if the attitude of the apparatus is changed, the above-mentioned actions remain unchanged. Thus, the solid reactant around the supply holes supplied with the reaction solution is consumed, and all of the surfaces of the solid reactant opposing the supply holes are uniformly consumed. Hence, even in the presence of a change in the attitude of the apparatus, the reaction solution is supplied only to the solid reactant, and does not flow out to sites other than the solid reactant.

The hydrogen production apparatus of the present invention according to another feature is characterized in that the solution feed control means comprises: a moving body moved when pushed by the solid reactant pressed by the pressing means; and an opening and closing member for opening and closing the supply hole in accordance with movement of the moving body.

According to this feature, while the moving body is moving when pushed by the solid reactant, the supply hole is in an open state to supply the reaction solution. When the moving body is not pushed by the solid reactant because of a decrease in the volume of the solid reactant upon reaction, that is, when the moving body departs from the solid reactant, the supply hole is brought to a closed state to stop the supply of the reaction solution.

The hydrogen production apparatus of the present invention according to another feature comprises urging means for pushing and urging the moving body toward the solid reactant, and wherein the moving body is a pillar member disposed in the supply hole, and is free to protrude from and retract into a wall surface on an inner side of the reactant container, and the opening and closing member is a seal member which closes the supply hole when the moving body is urged by the urging means to protrude from the wall surface on the inner side of the reactant container.

According to this feature, when the solid reactant is consumed, the pillar member is urged by the urging means, and moved thereby. The moving body moves, while keeping contact with the solid reactant, until the seal member closes the supply hole.

The hydrogen production apparatus of the present invention according to a further feature is characterized in that the pillar member is a pipe having a hollow portion communicating with the supply hole, and the seal member is blocking means which blocks the hollow portion of the pipe when the moving body is urged by the urging means to protrude from the wall surface on the inner side of the reactant container.

According to this feature, the reaction solution is supplied from the hollow portion of the pipe, and promptly brought into contact with the solid reactant. The pipe moves until the hollow portion is closed with the blocking means.

The hydrogen production apparatus of the present invention according to another feature is characterized in that the urging means is an elastic body sheet stuck to the wall surface on the inner side of the reactant container in correspondence with the supply hole, the pillar member is a valve body disposed inside the supply hole, the opening and closing member is a communication passage, formed in the valve body, for bringing the supply hole and the inner side of the reactant container into communication, and the communication passage becomes patent to permit flow-through of the reaction solution when the valve body is pushed by the solid reactant pressed by the pressing means, and the communication passage is blocked to inhibit flow-through of the reaction solution when the valve body undergoes a resilient force of the elastic body sheet.

According to this feature, when the valve body is pushed by the solid reactant, the elastic body sheet elastically deforms to open the communication passage, supplying the reaction solution. In a state where the solid reactant reacts, the valve body moves under the resilient force of the elastic body sheet, and the pushing force from the solid reactant is eliminated, namely, in a state where the valve body departs from the solid reactant, the communication passage closes under the resilient force of the elastic body sheet to stop the flow-through of the reaction solution.

The hydrogen production apparatus of the present invention according to a further feature is characterized in that the valve body is an elastic material provided integrally with the elastic body sheet.

According to this feature, the valve body can be formed integrally with the elastic body sheet. By arbitrarily setting the shape of the communication passage, the status of closing can be adjusted.

The hydrogen production apparatus of the present invention according to a further feature comprises urging means for pushing and urging the moving body toward the solid reactant, and wherein the moving body is a guide pillar member provided adjacently to the supply hole, and is free to protrude from and retract into a wall surface on an inner side of the reactant container, and the opening and closing member is a blocking member which is mounted on the guide pillar member, and blocks the supply hole when the guide pillar member is urged by the urging means to protrude from the wall surface on the inner side of the reactant container.

According to this feature, when the solid reactant is consumed, the guide pillar member is urged by the urging means, and moved thereby. The guide pillar member moves, while keeping contact with the solid reactant, until the blocking member mounted on the guide pillar member closes the supply hole.

The hydrogen production apparatus of the present invention according to another feature is characterized in that the urging means is furnished with a load plate for pressing the solid reactant toward the supply hole.

According to this feature, the solid reactant can be uniformly pressed by the pressing plate against the supply hole and the wall surface provided with the supply hole.

The hydrogen production apparatus of the present invention according to another feature comprises a pump for pressure-feeding the reaction solution from the reaction solution container to the reactant container.

According to this feature, the reaction solution can be reliably fed by the pump.

The hydrogen production apparatus of the present invention according to a further feature comprises differential pressure supply means for supplying the reaction solution from the reaction solution container to the reactant container by a pressure difference when an internal pressure of the reactant container lowers compared with an internal pressure of the reaction solution container.

According to this feature, the reaction solution can be reliably supplied, where necessary, by the differential pressure supply means according to the status of production of hydrogen. The concrete differential pressure supply means is composed of a water conduit for connecting the reactant container and the reaction solution container together in order to feed the reaction solution to the reaction container when the pressure of the reactant container becomes lower than the pressure of the reaction solution container side; a check valve provided in the water conduit in order to prevent the solid reactant or the reaction solution or the products from moving to the reaction solution container when the pressure of the reactant container becomes higher than the pressure of the reaction solution container side; and pressure supply means for applying a predetermined pressure to the interior of the reaction solution container.

Examples of the pressure supply means are various means. A first example is means using a plunger which is provided in the reaction solution container and presses the liquid surface of the reaction solution to pressurize the reaction solution, and an urging means (spring) for pressing the plunger. A second example is means which forms the reaction solution container from an elastic body, and pressurizes the reaction solution container itself to pressurize the reaction solution. A third example is pressure introduction means for introducing a gas into the reaction solution container. In this case, it is possible to prevent the reaction solution from flowing out of the reaction solution container by installing a check valve in the pressure introduction port, and it is also possible to apply an arbitrary pressure to the interior of the reaction solution container by installing a pump in the pressure introduction port.

The fuel cell system of the present invention intended for attaining the above objects, comprises: a fuel cell having an anode compartment supplied with hydrogen; and a hydrogen production apparatus, the discharge port of the hydrogen production apparatus being connected to the anode compartment of the fuel cell.

According to this feature, there can be constructed a fuel cell system having the hydrogen production apparatus, which can control a hydrogen production reaction, irrespective of a change in the attitude.

The fuel cell system of the present invention according to another feature is characterized in that the anode compartment and the reactant container form a closed space.

According to this feature, there can be constructed a fuel cell system which uses the total amount of hydrogen produced, because the produced hydrogen does not flow to the outside.

Effects of the Invention

The hydrogen production apparatus of the present invention can be configured as a hydrogen production apparatus which can control a hydrogen production reaction appropriately, even if the attitude of the apparatus is changed, because products do not stay on the solid reactant, and the reaction solution is not fed to portions other than the solid reactant.

The fuel cell system of the present invention can be configured as a fuel cell system equipped with the hydrogen production apparatus, which can control a hydrogen production reaction appropriately, even if the attitude of the apparatus is changed, because products do not stay on the solid reactant, and the reaction solution is not fed to portions other than the solid reactant.

BRIEF DESCRIPTION OF THE DRAWINGS

FIGS. 2($a$) and 2($b$) are configurational drawings of essential parts of a reactant container.

FIGS. 6($a$) and 6($b$) are configurational drawings of essential parts of the reactant container equipped with solution feeding means according to a fourth embodiment.

FIGS. 7($a$) and 7($b$) are configurational drawings of essential parts of the reactant container equipped with solution feeding means according to a fifth embodiment.

FIGS. 8($a$) and 8($b$) are configurational drawings of essential parts of the reactant container equipped with solution feeding means according to a sixth embodiment.

BEST MODE FOR CARRYING OUT THE INVENTION

Figure 1:
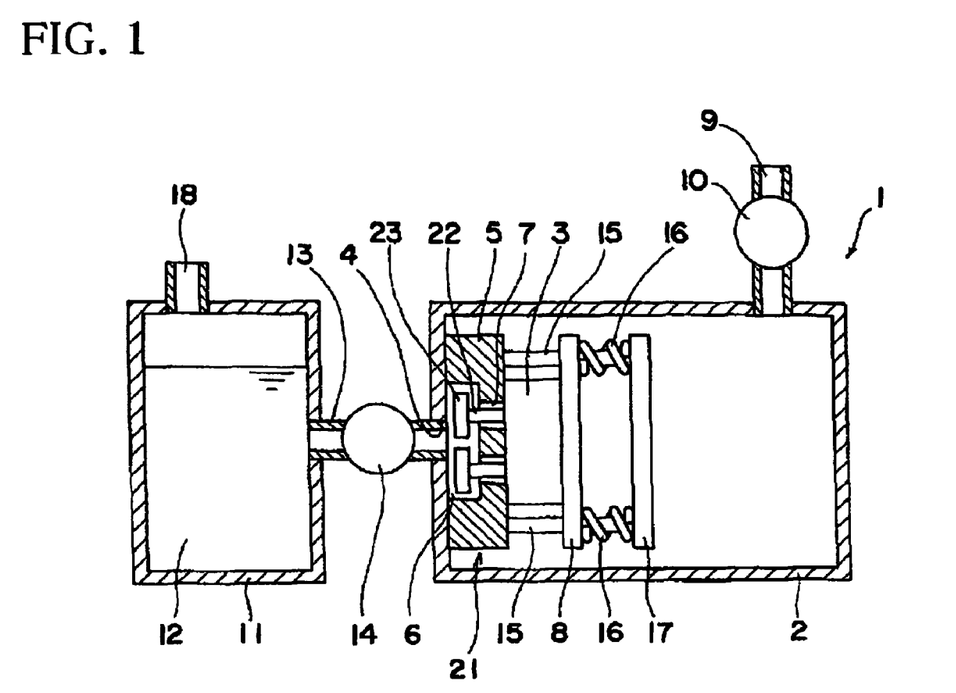
FIG. 1 is a schematic configurational drawing of a hydrogen production apparatus according to a first embodiment of the present invention.
Figure 2:
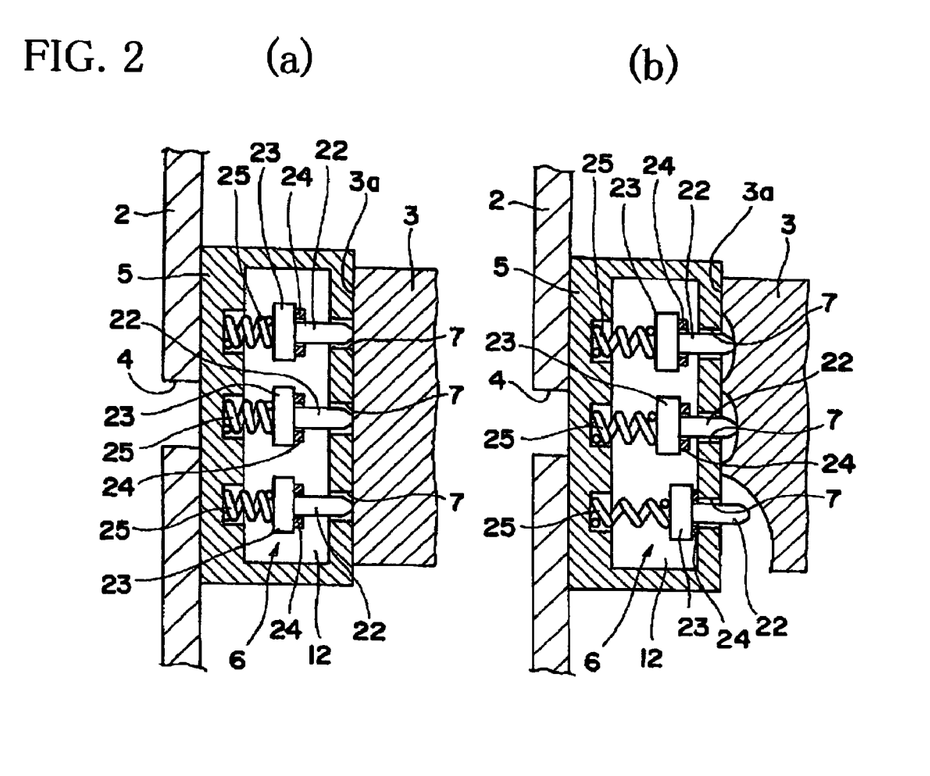
Figure 3:
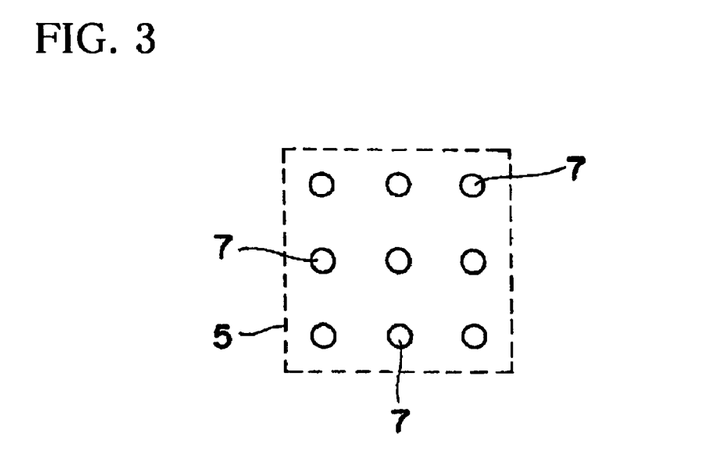
FIG. 3 is an explanation drawing of the status of arrangement of supply holes.

FIG. 1 shows the schematic configuration of a hydrogen production apparatus according to a first embodiment of the present invention. FIGS. 2($a$) and 2($b$) show the status of essential parts of a reactant container. FIG. 3 shows the status of arrangement of supply holes. FIG. 2($a$) represents the state in which all the supply holes are open. FIG. 2($b$) represents the state in which some of the supply holes are closed.

As shown in FIG. 1, a hydrogen production apparatus 1 has a reactant container 2, and columnar work 3 (for example, pellets of sodium boron hydride; columns of 15 mm in diameter and 20 mm in length) as a solid reactant is held within the reactant container 2. A supply port 4 is provided in a side wall of the reactant container 2, and an isolating member 5 is provided inside the reactor container 2 at the position of the supply port 4. The isolating member 5 has a liquid chamber 6 communicating with the supply port 4, and a plurality of supply holes 7 are provided in a wall surface of the isolating member 5. A total of 9 of the supply holes 7 are provided, in a 3 (vertically) by 3 (horizontally) pattern, in the wall surface, as shown in FIGS. 2(a), 2(b) and FIG. 3.

The work 3 is held to have an end surface 3a in contact with the wall surface of the isolating member 5 while being pressed against the supply holes 7 (the end surface is located within a predetermined distance from the supply holes 7). The other end surface 3b of the work 3 is pressed by a load plate 8. The load plate 8 presses the work 3 toward the supply holes 7 under the action of a pressing means (to be described later). The reactant container 2 is provided with a discharge port 9 for discharge of hydrogen produced, and a regulator valve 10 is provided in the discharge port 9.

A reaction solution container 11 is provided adjacently to the reactant container 2, and a reaction solution 12 (for example, an aqueous solution of nickel chloride: nickel chloride concentration 12%) is stored in the reaction solution container 11. The reaction solution container 11 and the supply port 4 of the reactant container 2 are connected by a water conduit 13, and the water conduit 13 is furnished with a valve 14 which opens and closes in response to a pressure difference to feed the reaction solution 12 to the liquid chamber 6 of the isolating member 5. A pump can be provided instead of the valve 14 to pressure-feed the reaction solution 12 by the power of the pump.

An explanation will be offered for the pressing means for pressing the work 3 toward the supply holes 7 via the load plate 8.

Support shafts 15 are provided on the wall surface of the isolating member 5 having the supply holes 7 provided therein, and the load plate 8 is slidably held by the support shafts 15. Helical compression springs 16 are held at the sites of the support shafts 15 penetrating the load plate 8, namely, the sites of the support shafts 15 protruding from the surface on the side opposite to the pressed surface of the work 3. The helical compression springs 16 are disposed to span a fixing plate 17 and the surface of the load plate 8 on the side opposite to the pressed surface of the work 3. That is, the load plate 8 is pressed toward the supply holes 7 of the isolating member 5 by the helical compression springs 16, and the work 3 is held in a state where it is pressed against the supply holes 7 by the load plate 8.

As the pressing means for pressing the load plate 8, it is also possible to provide helical compression springs between the load plate 8 on the side opposite to the pressed surface of the work 3 and the wall surface of the reactant container 2 on the side opposite to the supply port 4. Moreover, it is possible to urge the load plate 8 toward the supply port 4 of the reactant container 2 with the use of a magnet or a tension spring.

As the reaction solution 12, an aqueous solution of cobalt chloride, palladium chloride or the like, or an aqueous solution of malic acid (malic acid concentration: 25%), or an aqueous solution of succinic acid, citric acid or the like can be used, aside from the aqueous solution of nickel chloride.

The work 3 is held by having its end surface 3a pressed toward the supply holes 7 of the isolating member 5 by the load plate 8. When the pressure of the reactant container 2 is lower than the pressure of the reaction solution container 11, the valve 14 opens, whereby the reaction solution 12 is fed through the supply port 4 into the liquid chamber 6 of the isolating member 5.

A pressure supply means for applying a predetermined pressure to the interior of the reaction solution container 11 is provided so that the pressure of the reactant container 2 becomes lower than the pressure of the reaction solution container 11. A pressure introduction port 18 for introducing a gas into the reaction solution container 11 is adopted as the pressure supply means. In this case, the reaction solution 12 can be prevented from flowing out of the reaction solution container 11 by installing a check valve in the pressure introduction port 18. Moreover, an arbitrary pressure can be applied to the interior of the reaction solution container 11 by installing a pump in the pressure introduction port 18.

As the pressure supply means, it is also possible to use a plunger which is provided in the reaction solution container 11 and presses the liquid surface of the reaction solution 12 to pressurize the reaction solution 12, and an urging means (spring) for pressing the plunger. Moreover, it is possible to form the reaction solution container from an elastic body, and use a means for pressurizing the reaction solution container itself to pressurize the reaction solution.

When the reaction solution 12 is fed to the liquid chamber 6 of the isolating member 5, the reaction solution 12 contacts the end surface 3a of the work 3 in the supply hole 7 to initiate a reaction, producing hydrogen. Since the end surface 3a of the work 3 is pressed against the wall surface where the supply holes 7 are present, hydrogen produced moves in the gap between the wall surface and the end surface 3a of the work 3, and products also move together with the hydrogen. The resulting hydrogen is sent through the discharge port 9 to a consumption section via the regulator valve 10.

The above-described hydrogen production apparatus 1 is equipped with a solution feed control means 21 for supplying the reaction solution 12 to the work 3 irrespective of a change in its orientation or attitude. The solution feed control means 21 opens the supply hole 7 to permit the flow-through of the reaction solution 12 from the liquid chamber 6, when the work 3 is close to the supply hole 7. When the work 3 is spaced from the supply hole 7 (when the end surface of the work is not located within the predetermined distance), the solution feed control means 21 closes the supply hole 7 to inhibit the flow-through of the reaction solution 12 from the liquid chamber 6.

The solution feed control means 21 (first embodiment) will be described based on FIGS. 2(a), 2(b).

As shown in the drawings, a strut 22, which is a pillar member (moving body), is held movably in the supply hole 7 of the isolating member 5. A gap through which the reaction solution 12 can flow is formed between the strut 22 and the supply hole 7. The leading end side of the strut 22 (i.e., its right end side in the drawings) is free to protrude from and retract into the wall surface of the isolating member 5 (inner wall surface of the reactant container 2), and a valve body 23 is mounted on the proximal end side of the strut 22 (i.e., its left end side in the drawings) located within the liquid chamber 6. A seal member 24 is provided on the inner side of the valve body 23 (i.e., beside the strut 22) and, when the leading end side of the strut 22 protrudes from the wall surface of the isolating member 5, the supply hole 7 is closed with the seal member 24 (the state in a lower part of FIG. 2(b)). The strut 22 provided with the valve body 23 is pushed and urged toward a side on which it protrudes from the wall surface of the isolating member 5, namely, toward the work 3, by a compression spring 25 as an urging means, and is thereby pressed against the end surface 3a of the work 3 to make contact with it.

If the work 3 is pushed by the load plate 8 (see FIG. 1) toward the supply hole 7 of the isolating member 5, and held in a state pressed against the supply holes 7, the strut 22 is pushed by the work 3 and retracted in opposition to the urging force of the compression spring 25, as shown in FIG. 2(a). When, in this state, the reaction solution 12 is sent into the liquid chamber 6, the reaction solution 12 is supplied to the end surface 3a of the work 3 through the gap between the strut 22 and the supply hole 7. At the site of the supply hole 7, the reaction solution 12 contacts the end surface 3a of the work 3, resulting in a reaction between the work 3 and the reaction solution 12 to produce hydrogen.

If the plurality of the supply holes 7 are arranged vertically depending on the attitude of the hydrogen production apparatus 1 (see FIG. 1), a larger amount of the reaction solution 12 is supplied to the supply holes 7 located below than to the supply holes 7 located above by gravity. As shown in FIG. 2(b), therefore, a lower part of the end surface 3a of the work 3 is eroded more greatly. Since the leading end of the strut 22 keeps contacting the end surface 3a of the work 3 under the urging force of the compression spring 25, the strut 22 moves in a protruding direction under the urging force of the compression spring 25, as the depth of erosion increases. When the erosion of the work 3 progresses and the leading end of the strut 22 departs from the end surface 3a of the work 3 (that is, when the amount of movement reaches a predetermined amount), the supply hole 7 is closed with the seal member 24 (the lowermost strut 22 in FIG. 2(b)) to stop the supply of the reaction solution 12.

The predetermined distance over which the end surface 3a of the work 3 contacts the supply hole 7 (the end surface 3a of the work 3 is located within the predetermined distance from the supply hole 7) is preferably the maximum length over which the leading end side of the strut 22 protrudes from the wall surface of the isolating member 5. That is, when the leading end side of the strut 22 reaches the largest length over which it protrudes from the wall surface of the isolating member 5 (at the time of maximum protrusion), in other words, when the end surface 3a of the work 3 is not located within the predetermined distance from the supply hole 7, the supply hole 7 is closed with the seal member 24.

For this reason, the reaction occurs only at the upper part of the end surface 3a of the work 3, whereby an upper part of the work 3 is consumed, and the volume of the work 3 decreases. As a result, the lower supply hole 7 approaches the end surface 3a of the work 3 again, whereupon the strut 22 is pushed by the work 3 to bring the supply hole 7 into an open state. Thus, the reaction solution 12 is fed to initiate the reaction. Afterwards, this procedure is repeated, and all of the surfaces of the work 3 opposing the supply holes 7 are uniformly consumed. Hence, the reaction solution 12 is supplied only to the work 3, and does not flow out to sites other than the work 3.

Accordingly, the products do not stay on the work 3, and the reaction solution 12 is not fed to portions other than the work 3. Even if the attitude of the hydrogen production apparatus 1 is changed, this apparatus can control the hydrogen production reaction appropriately.

Figure 4:
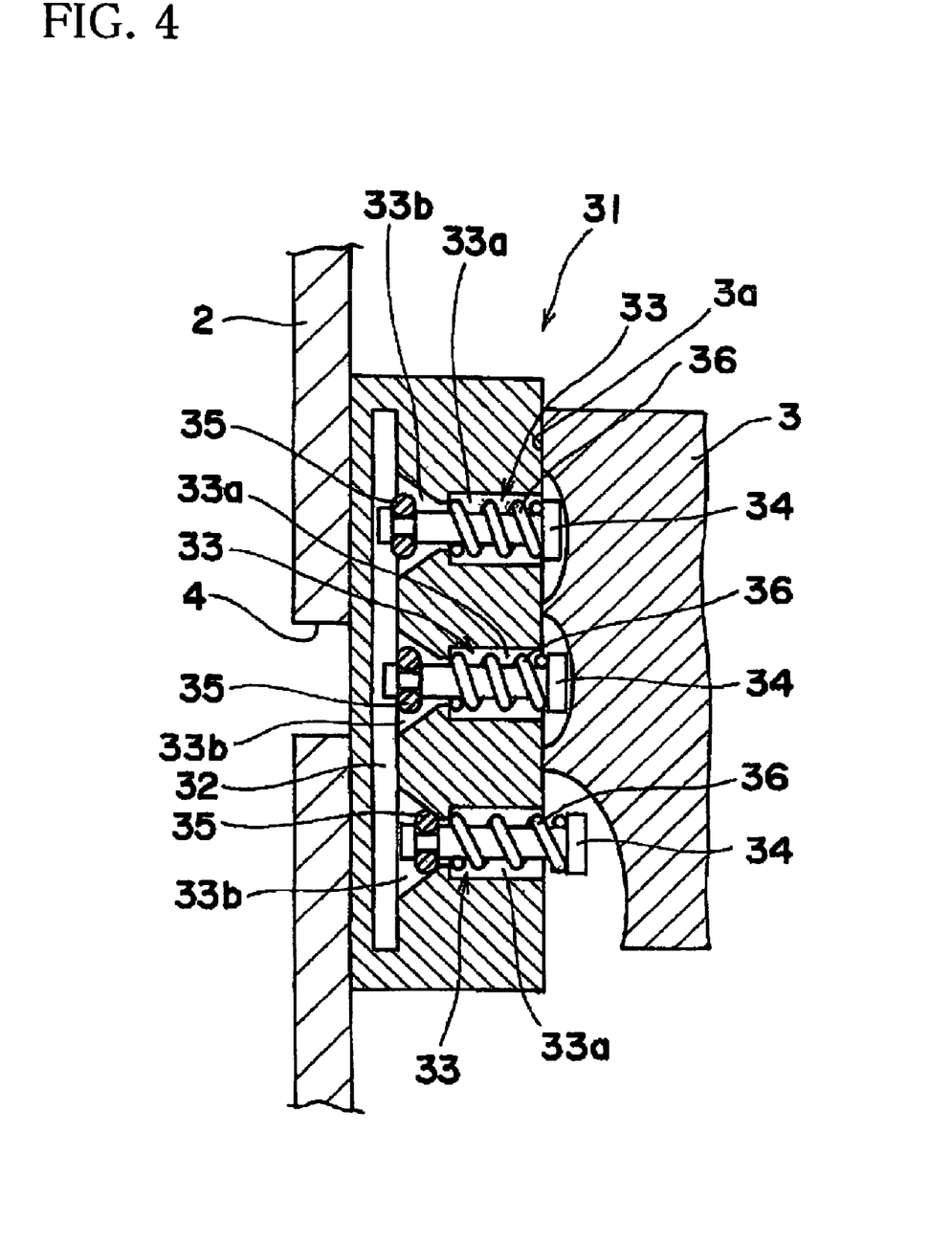
FIG. 4 is a configurational drawing of essential parts of the reactant container equipped with solution feeding means according to a second embodiment.

A second embodiment of solution feeding means will be described based on FIG. 4. FIG. 4 shows the status of essential parts of the reactant container equipped with solution feeding means according to the second embodiment. The same members as the members shown in FIGS. 2(a), 2(b) are assigned the same numerals as in these drawings.

An isolating member 31 is provided inside a reactor container 2 at the position of a supply port 4. The isolating member 31 has a liquid chamber 32 communicating with the supply port 4, and a plurality of supply holes 33 are provided in a wall surface of the isolating member 31. A total of 9 of the supply holes 33 are provided, in a 3 (vertically) by 3 (horizontally) pattern, in the wall surface, for example, as in the first embodiment.

The supply hole 33 of the isolating member 31 is defined by a tubular supply passage 33a and a valve seat passage 33b having a small-diameter portion. A strut 34, which is a pillar member (moving body), is supported movably by the supply hole 33. A gap through which a reaction solution 12 can flow is formed between the strut 34 and the supply hole 33. An O-ring 35 as a seal member is mounted on the strut 34 situated in the valve seat passage 33b. When the leading end side of the strut 34 protrudes from the wall surface of the isolating member 31, an end part of the valve seat passage 33b of the supply hole 33 (i.e., the part of the valve seat passage 33b in communication with the supply passage 33a) is closed with the O-ring 35 (the state in a lower part of FIG. 4). That is, when an end surface 3a of work 3 is located within a predetermined distance from the supply hole 33, the flow-through of a reaction solution 12 is permitted. When the end surface of the work 3 is not located within the predetermined distance from the supply hole 33, the flow-through of the reaction solution 12 is inhibited. A compression spring 36 as an urging means is disposed on the outer periphery of the strut 34 located in the supply passage 33a. The strut 34 is pushed and urged toward a side where it protrudes from the wall surface of the isolating member 31, namely, toward the work 3, by the compression spring 36, and is thereby pressed against the end surface 3a of the work 3 to make contact with it. Preferably, the predetermined distance in the second embodiment is also set according to the maximum length of protrusion of the strut 34, as in the first embodiment.

If the work 3 is pushed by a load plate 8 (see FIG. 1) toward the supply hole 33 of the isolating member 31, and held in a state pressed against the supply holes 33, the strut 34 is pushed by the work 3 and retracted in opposition to the urging force of the compression spring 36. As a result, the O-ring 35 is separated from the end part of the valve seat passage 33b. When, in this state, the reaction solution 12 is fed into the liquid chamber 32, the reaction solution 12 is supplied to the end surface 3a of the work 3 through the gap between the strut 34 and the supply hole 33. At the site of the supply hole 33, the reaction solution 12 contacts the end surface 3a of the work 3, resulting in a reaction between the work 3 and the reaction solution 12 to produce hydrogen.

If the plurality of the supply holes 33 are arranged vertically depending on the attitude of the apparatus, a larger amount of the reaction solution 12 is supplied to the lower supply holes 33 than to the upper supply holes 7 by gravity. Thus, a lower part of the end surface 3a of the work 3 is eroded more greatly. Since the leading end of the strut 34 keeps contacting the end surface 3a of the work 3 under the urging force of the compression spring 36, the strut 34 moves in a protruding direction under the urging force of the compression spring 36, as the depth of erosion increases. When the erosion of the work 3 progresses and the leading end of the strut 34 departs from the end surface 3a of the work 3 (that is, when the amount of movement reaches a predetermined amount), the end part of the valve seat passage 33b is closed with the O-ring 35 (the lowermost strut 34 in FIG. 4) to stop the supply of the reaction solution 12.

For this reason, the reaction occurs only at the upper part of the end surface 3a of the work 3, whereby an upper part of the work 3 is consumed, and the volume of the work 3 decreases. As a result, the lower supply hole 7 approaches the end surface 3a of the work 3 again, whereupon the strut 34 is pushed by the work 3 to bring the supply hole 33 into an open state. Thus, the reaction solution 12 is fed to initiate the reaction. Afterwards, this procedure is repeated, and all of the surfaces of the work 3 opposing the supply holes 33 are uniformly consumed. Hence, the reaction solution 12 is supplied only to the work 3, and does not flow out to sites other than the work 3.

Accordingly, as in the first embodiment, the products do not stay on the work 3, and the reaction solution 12 is not fed to portions other than the work 3. Even if the orientation or attitude of the hydrogen production apparatus 1 is changed, this apparatus can control the hydrogen production reaction appropriately.

Figure 5:
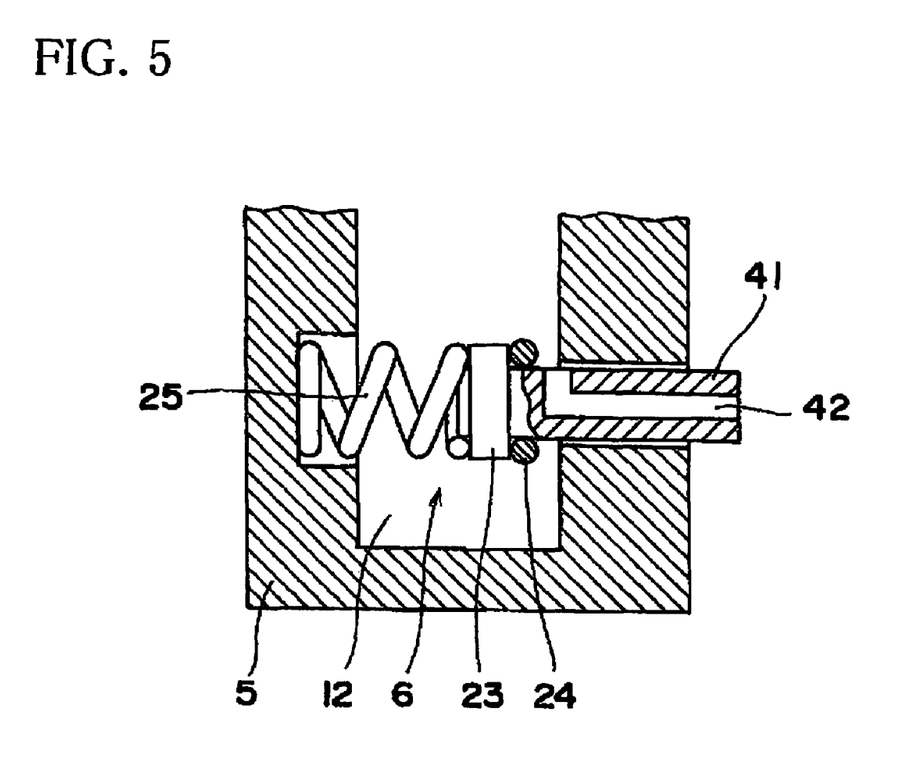
FIG. 5 is a configurational drawing of essential parts of the reactant container equipped with solution feeding means according to a third embodiment.

A third embodiment of solution feeding means will be described based on FIG. 5. FIG. 5 shows the status of essential parts of the reactant container equipped with solution feeding means according to the third embodiment. The same members as the members shown in FIGS. 2(*a*), 2(*b*) are assigned the same numerals as in these drawings, and duplicate explanations are omitted.

The solution feeding means shown in FIG. 5 has the configuration of a pipe in which a flow path 42 defining a hollow portion is formed in a strut 41 as a pillar member (moving body), as compared with the solution feeding means shown in FIGS. 2(*a*), 2(*b*). In a state where the strut 41 is pushed by a work 3 (a state where erosion does not progress; when the end surface of the work is located within a predetermined distance from the end surface of the flow path 42 which is the supply hole), a reaction solution 12 is supplied from the flow path 42 of the strut 41, and promptly brought into contact with the work 3. When the erosion of the work 3 progresses and the strut 41 protrudes (when the end surface of the work is not located within the predetermined distance from the end surface of the flow path 42 which is the supply hole), a supply hole 7 is closed with a seal member 24, whereby the flow path 42 is closed. Preferably, the predetermined distance in the third embodiment is also set according to the maximum length of protrusion of the strut 41.

Accordingly, as in the first and second embodiments, the products do not stay on the work 3, and the reaction solution 12 is not fed to portions other than the work 3. Even if the attitude of the hydrogen production apparatus 1 is changed, this apparatus can control the hydrogen production reaction appropriately.

Figure 6:
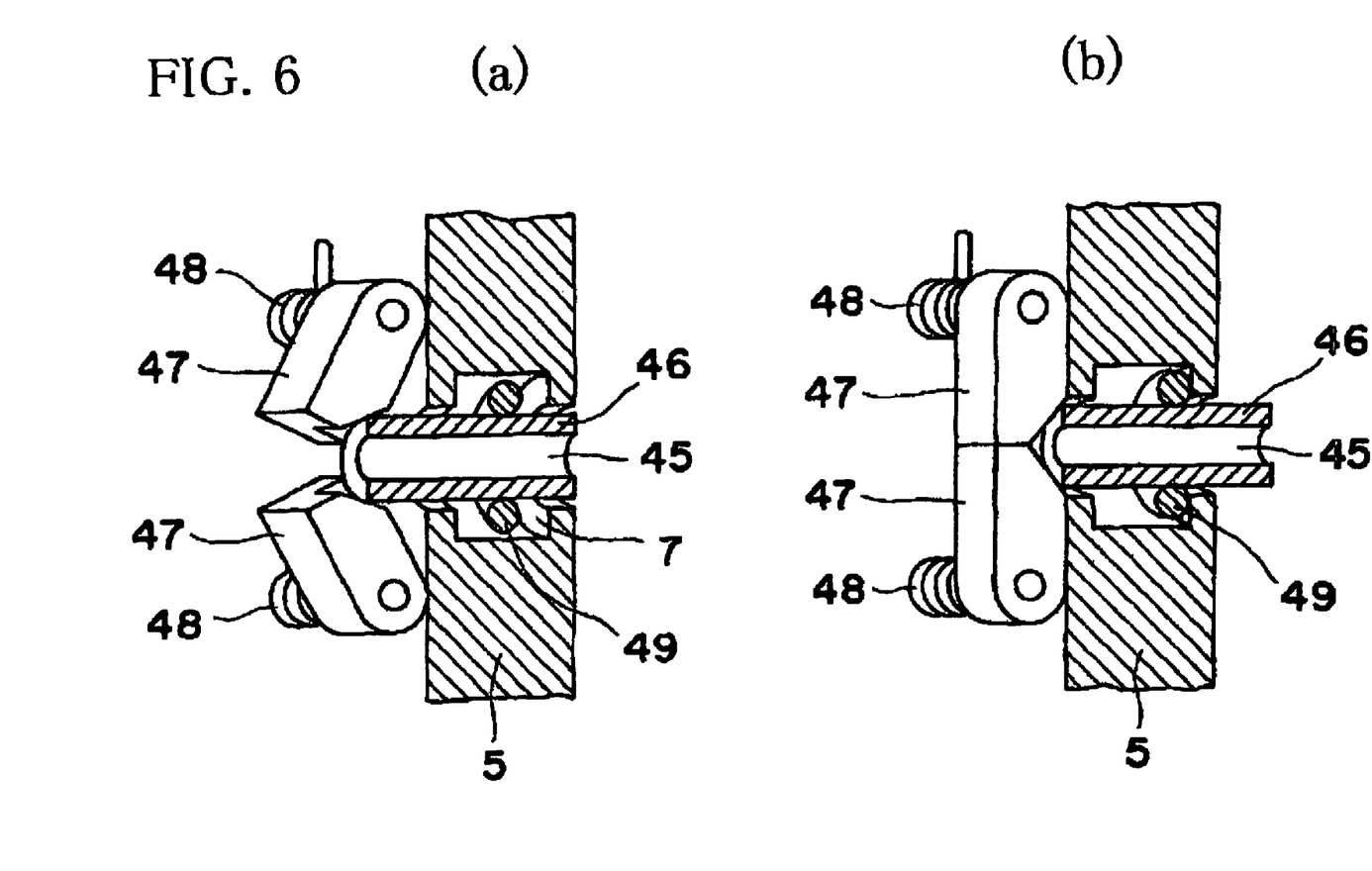

A fourth embodiment of solution feeding means will be described based on FIGS. 6(*a*), 6(*b*). FIGS. 6(*a*), 6(*b*) show the status of essential parts of the reactant container equipped with solution feeding means according to the fourth embodiment. The same members as the members shown in FIGS. 2(*a*), 2(*b*) are assigned the same numerals as in these drawings, and duplicate explanations are omitted.

The solution feeding means shown in FIGS. 6(*a*), 6(*b*) has a pipe 46 movably supported in a supply hole 7, the pipe 46 having a hollow portion 45. The leading end side of the pipe 46 (i.e., the right side in the drawings) faces a work 3 (see FIGS. 2(*a*), 2(*b*)), and the proximal end of the pipe 46 (i.e., the rightward liquid chamber side in the drawings) is urged toward the work 3 (see FIGS. 2(*a*), 2(*b*)) by opening and closing members 47. That is, the opening and closing members 47 are provided to be urged in a pivoting direction by torsion springs 48 as urging means. The opening and closing members 47 are urged to be pivoted, whereby the proximal end of the pipe 46 is pushed, and the hollow portion 45 is blocked (blocking means: see FIG. 6(*b*)).

In a state where the leading end side of the pipe 46 is pushed from the side of the work 3 (a state where erosion does not progress; when the end surface of the work is located within a predetermined distance from the end surface of the hollow portion 45 which is the supply hole), the opening and closing members 47 are pivoted against the urging force of the torsion springs 48, and the hollow portion 45 becomes open. As a result, a reaction solution 12 (see FIGS. 2(*a*), 2(*b*)) is supplied from the hollow portion 45, and promptly brought into contact with the work 3 (see FIG. 6(*a*)). When the erosion of the work 3 progresses and the pipe 46 protrudes (when the end surface of the work is not located within the predetermined distance from the end surface of the hollow portion 45 which is the supply hole), the hollow portion 45 is blocked by the opening and closing members 47 urged to be pivoted. The numeral 49 in the drawings denotes an O-ring for preventing the reaction solution 12 (see FIGS. 2(*a*), 2(*b*)) from leaking through the gap between the pipe 46 and the supply hole 7. Preferably, the predetermined distance in the fourth embodiment is also set according to the maximum length of protrusion of the pipe 46.

Accordingly, as in the first to third embodiments, the products do not stay on the work 3, and the reaction solution 12 is not fed to portions other than the work 3. Even if the attitude of the hydrogen production apparatus 1 is changed, this apparatus can control the hydrogen production reaction appropriately.

Figure 7:
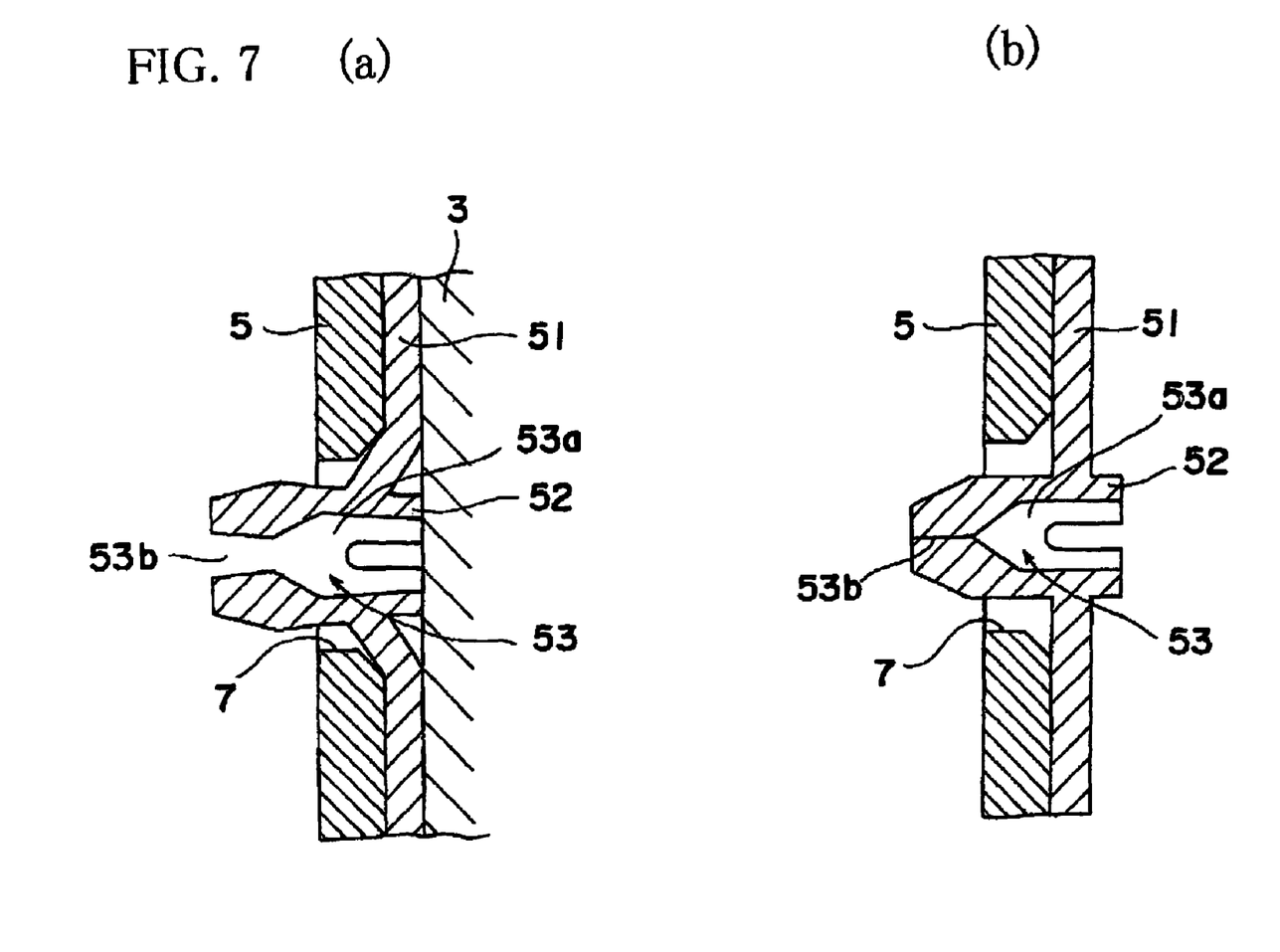

A fifth embodiment of solution feeding means will be described based on FIGS. 7(*a*), 7(*b*). FIGS. 7(*a*), 7(*b*) show the status of essential parts of the reactant container equipped with solution feeding means according to the fifth embodiment. The same members as the members shown in FIGS. 2(*a*), 2(*b*) are assigned the same numerals as in these drawings, and duplicate explanations are omitted.

The solution feeding means shown in FIGS. 7(*a*) 7(*b*) has an elastic body sheet 51, as an urging means, stuck to the wall surface of an isolating member 5 corresponding to a supply hole 7, and has a valve body 52, as a pillar member (moving body), disposed inside the supply hole 7. The valve body 52 is formed of an elastic material provided integrally with the elastic body sheet 51. A communication passage 53, which brings the supply hole 7 and the side of a work 3 (the inner side of a reactant container) into communication, is provided in the valve body 52. When the valve body 52 is pushed by the work 3, the communication passage 53 becomes patent to permit the flow-through of a reaction solution 12 (see FIGS. 2(*a*), 2(*b*)). When the valve body 52 is subject to the resilient force of the elastic body sheet 51, the communication passage 53 is closed to inhibit the flow-through of the reaction solution 12 (see FIGS. 2(*a*), 2(*b*)). That is, the side of the communication passage 53 in contact with the work 3 defines a large-diameter portion 53*a*, while the side of the communication passage 53 facing a liquid chamber 6 defines a slit portion 53*b*.

In a state where the leading end side of the valve body 52 (the side of the large-diameter portion 53*a* of the communication passage 53) is pushed from the side of the work 3 (a state where erosion does not progress; when the end surface of the work 3 is located within a predetermined distance from the end surface of the communication passage 53 which is the supply hole), the valve body 52 is elastically deformed to open the slit portion 53*b*, permitting the flow of the reaction solution 12 through the communication passage 53. In this state, the reaction solution 12 (see FIGS. 2(*a*), 2(*b*)) is supplied from the communication passage 53, and promptly brought into contact with the work 3 (see FIG. 7(*a*)). When the erosion of the work 3 progresses, the valve body 52 protrudes under the resilient force. When the pushing force from the work 3 is eliminated (that is, when the end surface of the work 3 is not located within the predetermined distance from the end surface of the communication passage 53 which is the supply hole), the slit portion 53*b* is closed by the resilient force, and the communication passage 53 is blocked to inhibit the flow-through of the reaction solution 12. Preferably, the predetermined distance in the fifth embodiment is also set according to the maximum length of protrusion of the valve body 52.

Accordingly, as in the first to fourth embodiments, the products do not stay on the work 3, and the reaction solution 12 (see FIGS. 2(a), 2(b)) is not fed to portions other than the work 3. Even if the attitude of the hydrogen production apparatus 1 is changed, this apparatus can control the hydrogen production reaction appropriately. Furthermore, the status of blocking of the communication passage 53 can be adjusted by arbitrarily setting the shapes, such as thicknesses, of the elastic body sheet 51 and the valve body 52 which is an elastic material integrated with the elastic body sheet 51.

Figure 8:
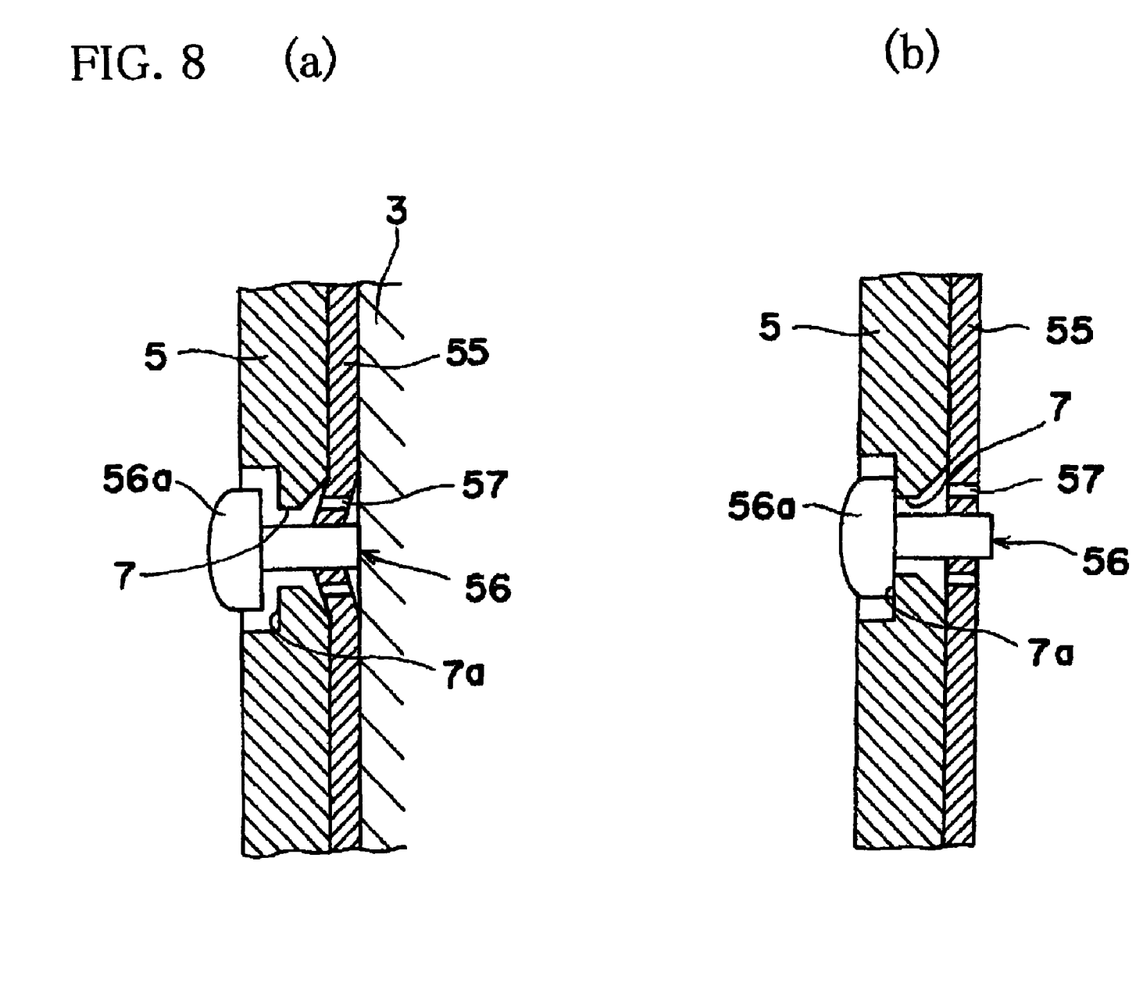

A sixth embodiment of solution feeding means will be described based on FIGS. 8(a), 8(b). FIGS. 8(a), 8(b) show the status of essential parts of the reactant container equipped with solution feeding means according to the sixth embodiment. The same members as the members shown in FIGS. 2(a), 2(b) are assigned the same numerals as in these drawings, and duplicate explanations are omitted.

The solution feeding means shown in FIGS. 8(a), 8(b) has an elastic body sheet 55, as an urging means, stuck to the wall surface of an isolating member 5 corresponding to a supply hole 7, and has an elastic pin 56, as a pillar member (moving body), mounted inside the supply hole 7. Discharge orifices 57 are formed around a site of the elastic body sheet 55 where the elastic pin 56 is mounted. A seat portion 7a, which a head 56a of the elastic pin 56 contacts, is formed in the supply hole 7. Under the resilient force of the elastic body sheet 55, the head 56a of the elastic pin 56 contacts the head 7a, closing the supply hole 7. If a pushing force from the work 3 is applied to the leading end of the elastic pin 56, the elastic body sheet 55 elastically deforms. Thus, the head 56a of the elastic pin 56 separates from the seat portion 7a, opening the supply hole 7.

In a state where the leading end side of the elastic pin 56 is pushed from the side of the work 3 (a state where erosion does not progress: when the end surface of the work is located within a predetermined distance from the supply hole 7), the elastic body sheet 55 is elastically deformed to separate the head 56a of the elastic pin 56 from these at portion 7a, permitting the flow of a reaction solution 12 (FIGS. 2(a), 2(b)) through the supply hole 7. In this state, the reaction solution 12 (see FIGS. 2(a), 2(b)) is supplied from the supply hole 7 via the discharge orifices 57, and promptly brought into contact with the work 3 (see FIG. 8(a)). When the erosion of the work 3 progresses, the elastic pin 56 protrudes under the resilient force of the elastic body sheet 55. When the pushing force from the work 3 is eliminated (that is, when the end surface of the work is not located within the predetermined distance from the end surface of the supply hole 7), the head 56a of the elastic pin 56 contacts the seat portion 7a, closing the supply hole 7 (see FIG. 8(b)). Preferably, the predetermined distance in the sixth embodiment is also set according to the maximum length of protrusion of the elastic pin 56.

Accordingly, as in the first to fifth embodiments, the products do not stay on the work 3, and the reaction solution 12 (see FIGS. 2(a), 2(b)) is not fed to portions other than the work 3. Even if the attitude of the hydrogen production apparatus 1 is changed, this apparatus can control the hydrogen production reaction appropriately. Furthermore, the status of closure of the supply hole 7 can be adjusted by arbitrarily setting the shapes of the elastic body sheet 55 and the elastic pin 56.

Figure 9:
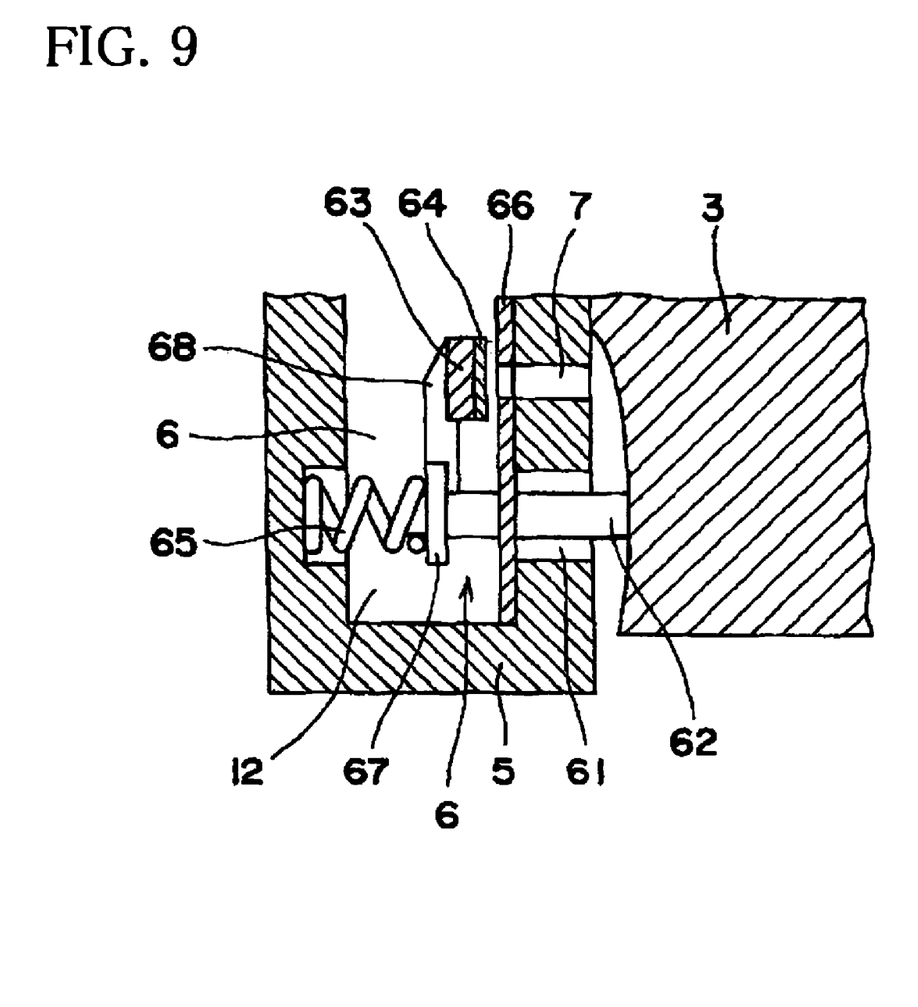
FIG. 9 is a configurational drawing of essential parts of the reactant container equipped with solution feeding means according to a seventh embodiment.

A seventh embodiment of solution feeding means will be described based on FIG. 9. FIG. 9 shows the status of essential parts of the reactant container equipped with solution feeding means according to the seventh embodiment. The same members as the members shown in FIGS. 2(a), 2(b) are assigned the same numerals as in these drawings, and duplicate explanations are omitted.

A guide hole 61 is formed adjacently to a supply hole 7 of an isolating member 5, and a guide pillar member 62 (moving body) is movably supported in the guide hole 61. The leading end side of the guide pillar member 62 (i.e., its right end side in the drawing) is free to protrude from and retract into the wall surface of the isolating member 5 (inner wall surface of a reactant container 2), and the guide pillar member 62 is pushed and urged toward a side where it protrudes from the wall surface of the isolating member 5, namely, toward the work 3, by a compression spring 65 as an urging means via a spring seat 67. A valve body 63 as a blocking member is mounted on the guide pillar member 62 via a connecting material 68, and a seal material 64 to make close contact with the supply hole 7 is mounted on the valve body 63. The numeral 66 in the drawing denotes a seal plate for inhibiting the leakage of a reaction solution 12 from the guide hole 61.

In a state where the guide pillar member 62 is pushed by the work 3 (a state where erosion does not progress: when the end surface of the work is located within a predetermined distance from the supply hole 7), the guide pillar member 62 is retracted against the urging force of the compression spring 65. As a result, the valve body 63 is separated from the supply hole 7 to permit a flow through the supply hole 7. In this state, the reaction solution 12 is supplied from the supply hole 7, and brought into contact with the work 3 (the illustrated state). When the erosion of the work 3 progresses, the guide pillar member 62 protrudes under the urging force of the compression spring 65. When the pushing force from the work 3 is eliminated (that is, when the end surface of the work is not located within the predetermined distance from the end surface of the supply hole 7), the seal material 64 of the valve body 63 intimately contacts the supply hole 7, closing the supply hole 7. Preferably, the predetermined distance in the seventh embodiment is also set according to the maximum length of protrusion of the guide pillar member 62.

Accordingly, as in the first to sixth embodiments, the products do not stay on the work 3, and the reaction solution 12 is not fed to portions other than the work 3. Even if the attitude of the hydrogen production apparatus 1 is changed, this apparatus can control the hydrogen production reaction appropriately.

Figure 10:
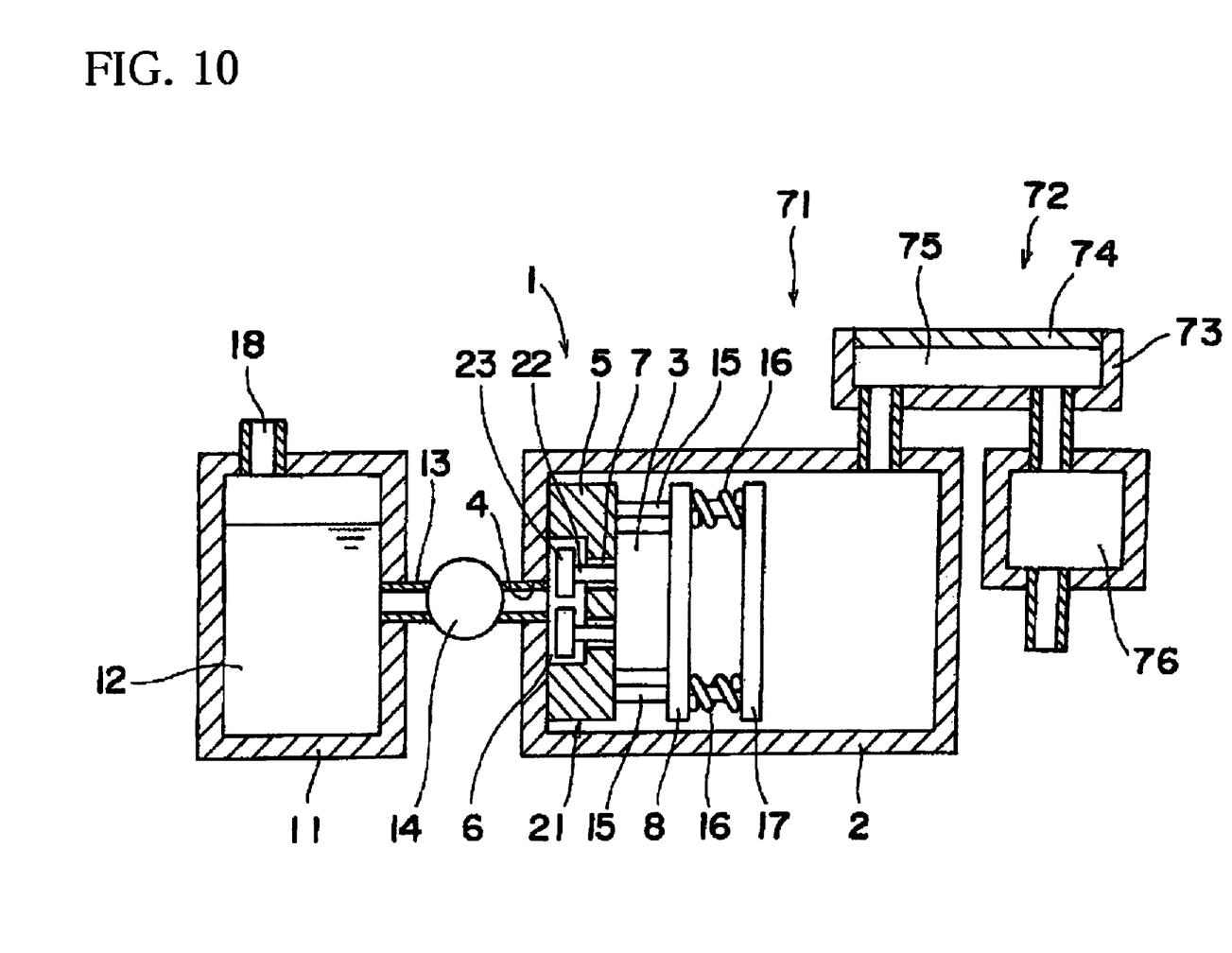
FIG. 10 is a schematic configurational drawing of a fuel cell system according to the first embodiment.
Figure 11:
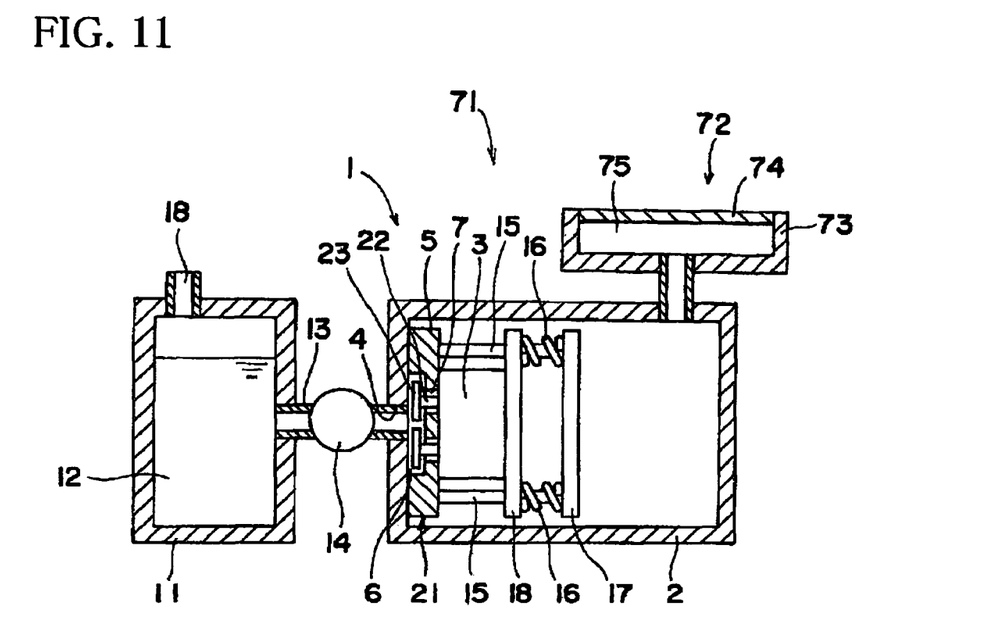
FIG. 11 is a schematic configurational drawing of a fuel cell system according to the second embodiment.

A fuel cell system according to the present invention will be described based on FIG. 10 and FIG. 11. FIG. 10 shows the schematic configuration of a fuel cell system according to the first embodiment of the present invention. FIG. 11 shows the schematic configuration of a fuel cell system according to the second embodiment of the present invention.

A fuel cell system 71 shown in FIG. 10 has a fuel cell 72 connected to the discharge port 9 of the reactant container 2 of the hydrogen production apparatus 1 shown in FIGS. 1 to 3. In the fuel cell 72, an anode chamber 73 is provided, and the anode chamber 73 constitutes an anode compartment 75 of a fuel cell unit cell 74. A treatment chamber 76 is connected to the anode compartment 75, and is opened as appropriate. Hydrogen supplied into the anode compartment 75 is consumed by a fuel cell reaction in the anode. The amount of consumption of hydrogen in the anode is determined by the output current of the fuel cell 72.

As the solution feeding means of the hydrogen production apparatus to which the fuel cell 72 is connected, it is possible to apply that of any of the structures shown in FIGS. 4 to 9.

As shown in FIG. 11, the anode compartment 75 and the reactant container 2 may constitute a closed space. By constituting the closed space, a fuel cell system, which uses the total amount of hydrogen produced by the hydrogen production apparatus 1, can be constructed, because hydrogen does not flow to the outside.

As the solution feeding means of the hydrogen production apparatus to which the fuel cell 72 is connected, it is possible to apply that of any of the structures shown in FIGS. 4 to 9.

Accordingly, the above-mentioned fuel cell system can be configured as a fuel cell system equipped with the hydrogen production apparatus 1, which can control the hydrogen production reaction appropriately, even if the attitude of the apparatus is changed, because the products do not stay on the work 3, and the reaction solution 12 is not fed to portions other than the work 3.

INDUSTRIAL APPLICABILITY

The present invention can be utilized, for example, in the industrial field of hydrogen production apparatuses for producing hydrogen by decomposing a metal hydride, and fuel cell systems using hydrogen produced by the hydrogen production apparatuses as a fuel.

The invention claimed is:

1. A hydrogen production apparatus, comprising:
a reaction solution container accommodating a reaction solution;
a reactant container which has a plurality of supply holes fed with the reaction solution from the reaction solution container, accommodates a solid reactant for accelerating production of hydrogen upon reaction with the reaction solution, and has a discharge port for discharging hydrogen produced;
pressing means for pressing the solid reactant, which is disposed in correspondence with the supply holes, toward the supply holes; and
solution feed control means, provided in each of the plurality of supply holes, for opening the supply hole to permit flow-through of the reaction solution when an end surface of the solid reactant pressed by the pressing means is located within a predetermined distance from the supply hole, and for closing the supply hole to inhibit flow-through of the reaction solution when the end surface of the solid reactant is not located within the predetermined distance from the supply hole.

2. The hydrogen production apparatus according to claim 1; wherein the solution feed control means at each supply hole comprises:
a moving body moved when pushed by the solid reactant pressed by the pressing means; and
an opening and closing member for opening and closing the supply hole in accordance with movement of the moving body.

3. The hydrogen production apparatus according to claim 2; further comprising urging means for pushing and urging the moving body toward the solid reactant, and
wherein the moving body is a pillar member disposed in the supply hole, and is free to protrude from and retract into a wall surface on an inner side of the reactant container, and
the opening and closing member is a seal member which closes the supply hole when the moving body is urged by the urging means to protrude from the wall surface on the inner side of the reactant container.

4. The hydrogen production apparatus according to claim 3; wherein
the pillar member is a pipe having a hollow portion communicating with the supply hole, and
the seal member is blocking means which blocks the hollow portion of the pipe when the moving body is urged by the urging means to protrude from the wall surface on the inner side of the reactant container.

5. The hydrogen production apparatus according to claim 3; wherein
the urging means is an elastic body sheet stuck to the wall surface on the inner side of the reactant container in correspondence with the supply hole,
the pillar member is a valve body disposed inside the supply hole,
the opening and closing member is a communication passage, formed in the valve body, for bringing the supply hole and the inner side of the reactant container into communication, and
the communication passage becomes open to permit flow-through of the reaction solution when the valve body is pushed by the solid reactant pressed by the pressing means, and the communication passage is blocked to inhibit flow-through of the reaction solution when the valve body undergoes a resilient force of the elastic body sheet.

6. The hydrogen production apparatus according to claim 5; wherein the valve body is an elastic material provided integrally with the elastic body sheet.

7. The hydrogen production apparatus according to claim 2; further comprising urging means for pushing and urging the moving body toward the solid reactant, and
wherein the moving body is a guide pillar member provided adjacently to the supply hole, and is free to protrude from and retract into a wall surface on an inner side of the reactant container, and
the opening and closing member is a blocking member which is mounted on the guide pillar member, and blocks the supply hole when the guide pillar member is urged by the urging means to protrude from the wall surface on the inner side of the reactant container.

8. The hydrogen production apparatus according to claim 1; wherein the urging means includes a load plate for pressing the solid reactant toward the supply hole.

9. The hydrogen production apparatus according to claim 1; further comprising a pump for pressure-feeding the reaction solution from the reaction solution container to the reactant container.

10. The hydrogen production apparatus according to claim 1; further comprising differential pressure supply means for supplying the reaction solution from the reaction solution container to the reactant container by a pressure difference when an internal pressure of the reactant container lowers compared with an internal pressure of the reaction solution container.

11. A fuel cell system comprising:
a fuel cell having an anode compartment supplied with hydrogen; and
the hydrogen production apparatus according to claim 1, the discharge port of the hydrogen production apparatus being connected to the anode compartment of the fuel cell.

12. The fuel cell system according to claim 11; wherein the anode compartment and the reactant container form a closed space.

* * * * *